US008065230B1

(12) United States Patent
Little

(10) Patent No.: US 8,065,230 B1
(45) Date of Patent: Nov. 22, 2011

(54) FAMILY PURCHASE CARD FOR DEVELOPING FINANCIAL MANAGEMENT SKILLS

(75) Inventor: Kathleen T. Little, Newark, DE (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 203 days.

(21) Appl. No.: 12/172,541

(22) Filed: Jul. 14, 2008

(51) Int. Cl.
*G06Q 40/00* (2006.01)

(52) U.S. Cl. ............................... 705/40; 705/34; 705/35

(58) Field of Classification Search .................... 705/40, 705/34, 35
See application file for complete search history.

(56) References Cited

U.S. PATENT DOCUMENTS

| | | | |
|---|---|---|---|
| 4,367,402 | A | 1/1983 | Giraud et al. |
| 4,443,027 | A | 4/1984 | McNeely et al. |
| 4,837,422 | A | 6/1989 | Dethloff et al. |
| 5,500,513 | A | 3/1996 | Langhans et al. |
| 5,621,640 | A | 4/1997 | Burke |
| 5,649,118 | A | 7/1997 | Carlisle et al. |
| 5,845,260 | A | 12/1998 | Nakano et al. |
| 5,953,710 | A * | 9/1999 | Fleming .......................... 705/38 |
| 5,963,925 | A | 10/1999 | Kolling et al. |
| 5,991,749 | A | 11/1999 | Morrill, Jr. |
| 6,032,134 | A | 2/2000 | Weissman |
| 6,052,675 | A | 4/2000 | Checchio |
| 6,088,682 | A | 7/2000 | Burke |
| 6,112,191 | A | 8/2000 | Burke |
| 6,128,603 | A | 10/2000 | Dent et al. |
| 6,173,269 | B1 | 1/2001 | Solokl et al. |
| 6,353,811 | B1 | 3/2002 | Weissman |
| 6,411,938 | B1 | 6/2002 | Gates et al. |
| 6,493,685 | B1 | 12/2002 | Ensel et al. |
| 6,636,833 | B1 | 10/2003 | Flitcroft et al. |
| 6,742,704 | B2 | 6/2004 | Fitzmaurice et al. |
| 6,839,687 | B1 | 1/2005 | Dent et al. |
| 6,839,692 | B2 | 1/2005 | Carrott et al. |
| 6,876,971 | B1 | 4/2005 | Burke |
| 6,993,510 | B2 | 1/2006 | Guy et al. |

(Continued)

FOREIGN PATENT DOCUMENTS

WO    WO 96/34358 A1    10/1996

(Continued)

OTHER PUBLICATIONS

Tom Rawstorne. (Jul. 10, 2008). What's your child buying online :Alcohol, knives, pornography . . . all bought over the internet by a 14-year-old boy using a debit card. So why are the banks giving them to children without telling their parents?. Daily Mail,50. Retrieved Jun. 30, 2011.*

(Continued)

*Primary Examiner* — Charles Kyle
*Assistant Examiner* — Kito R Robinson
(74) *Attorney, Agent, or Firm* — Robert J. Pugh; K&L Gates LLP

(57) ABSTRACT

Strategies, tools and techniques for establishing family purchase cards for customers of a financial institution are disclosed. The family purchase card may be established for a principal owner of a family in association with a household account held at the financial institution. The family purchase card may include a total purchase limit that can be allocated among one or more secondary purchase cards associated with various cardholders within the family. Different parameters may be configured for the secondary purchase cards, such as purchase limits, billing arrangements, activation or deactivation rules, and financial development milestone rules. The family purchase card may promote development of financial management skills and fiscal responsibility for various members of the family.

24 Claims, 4 Drawing Sheets

U.S. PATENT DOCUMENTS

| | | | |
|---|---|---|---|
| 7,031,939 B1 | 4/2006 | Gallagher et al. | |
| 7,039,440 B2 | 5/2006 | Rodriguez et al. | |
| 7,076,465 B1 | 7/2006 | Blagg et al. | |
| 7,110,979 B2 | 9/2006 | Tree | |
| 7,146,338 B2 | 12/2006 | Kight et al. | |
| 7,147,149 B2 | 12/2006 | Giraldin et al. | |
| 7,171,370 B2 | 1/2007 | Burke | |
| 7,175,073 B2 | 2/2007 | Kelley et al. | |
| 7,249,092 B2 * | 7/2007 | Dunn et al. | 705/38 |
| 7,249,097 B2 | 7/2007 | Hutchison et al. | |
| 7,264,153 B1 | 9/2007 | Burke | |
| 7,328,839 B2 | 2/2008 | Keohane et al. | |
| 7,502,758 B2 | 3/2009 | Burke | |
| 7,536,351 B2 | 5/2009 | Leblang et al. | |
| 7,571,849 B2 | 8/2009 | Burke | |
| 2001/0037315 A1 | 11/2001 | Saliba et al. | |
| 2001/0047310 A1 | 11/2001 | Russell | |
| 2002/0123949 A1 | 9/2002 | VanLeeuwen | |
| 2003/0028483 A1 | 2/2003 | Sanders et al. | |
| 2003/0050889 A1 | 3/2003 | Burke | |
| 2003/0083930 A1 | 5/2003 | Burke | |
| 2004/0019543 A1 * | 1/2004 | Blagg et al. | 705/35 |
| 2006/0122923 A1 | 6/2006 | Burke | |
| 2007/0005496 A1 | 1/2007 | Cataline et al. | |
| 2007/0034688 A1 | 2/2007 | Burke | |
| 2007/0061252 A1 | 3/2007 | Burke | |
| 2007/0061257 A1 | 3/2007 | Neofytides et al. | |
| 2007/0083465 A1 | 4/2007 | Ciurea et al. | |
| 2007/0094130 A1 | 4/2007 | Burke | |
| 2007/0100749 A1 | 5/2007 | Bachu et al. | |
| 2007/0162387 A1 | 7/2007 | Cataline et al. | |
| 2007/0214162 A1 | 9/2007 | Rice | |
| 2008/0120129 A1 | 5/2008 | Seubert et al. | |
| 2009/0204538 A1 | 8/2009 | Ley et al. | |

FOREIGN PATENT DOCUMENTS

WO      WO 03/030054 A1      4/2003

OTHER PUBLICATIONS

Lipman, Ronald, "Adding family to credit card not always wise", Houston Chronicle, chron.com, Jan. 18, 2008, 2 pages.
Kutner, Lawrence, "Parent & Child", The New York Times, nytimes.com, Aug. 19, 1993, 3 pages.
U.S. Appl. No. 12/152,073, filed May 12, 2008.
U.S. Appl. No. 12/152,028, filed May 12, 2008.
U.S. Appl. No. 12/152,074, filed May 12, 2008.
U.S. Appl. No. 12/120,995, filed May 15, 2008.
U.S. Appl. No. 12/479,378, filed Jun. 5, 2009.
Jane J. Kim, "Managing Your Money in Public View," *The Wall Street Journal*, dated Jun. 14, 2007, printed from http://online.wsj.com/article/SB118177906703834565.html, Internet site, accessed on Apr. 11, 2008, 5 pages.
"Obopay—Money Transfer by Cell Phone or Web," printed from https://www.obopay.com/consumer/GetHelp.do?target=HelpHowWorks, Internet site, accessed on Apr. 11, 2008, 4 pages.
"BillMonk.com," printed from https://www.billmonk.com/about/tour, Internet site, accessed on Apr. 11, 2008, 4 pages.
"Split It by TD Canada Trust Facebook," printed from http://www.facebook.com/apps/application.php?id=4245957541&ref=nf, Internet site, accessed on Apr. 11, 2008, 2 pages.
"ING Direct Electric Orange Checking Account," printed from http://banking.about.com/od/checkingaccounts/p/ingchecking.htm, Internet site, accessed on Apr. 11, 2008, 1 page.
"Know your financial health—at a glance!" printed from http://www.buxfer.com/tour.php?id=HomePage, Internet site, accessed on Apr. 11, 2008, 1 page.
"Use Buxfer's analytics to understand your finances," printed from http://www.buxfer.com/tour.php?id=Analytics, Internet site, accessed on Apr. 11, 2008, 1 page.
"Use Buxfer Groups to simplify shared finances," printed from http://www.buxfer.com/tour.php?id=Groups, Internet site, accessed on Apr. 11, 2008, 1 page.
"Report transactions easily; let Buxfer deal with the math," printed from http://www.buxfer.com/tour.php?id=Reporting, Internet site, accessed on Apr. 11, 2008, 1 page.
"Import statements from banks or credit card accounts," printed from http://www.buxfer.com/tour.php?id=Import, Internet site, accessed on Apr. 11, 2008, 1 page.
"Slice and dice through your transactions," printed from http://www.buxfer.com/tour.php?=Filters, Internet site, accessed on Apr. 11, 2008, 1 page.
"Transfer money online with Amazon Payments," printed from http://www.buxfer.com/tour.php?id=Send money, Internet site, accessed on Apr. 11, 2008, 1 page.
"Setup budgets to control your expenses," printed from http://www.buxfer.com/tour.php?id=Budgets, Internet site, accessed on Apr. 11, 2008, 1 page.
"Access Buxfer while on the move!" printed from http://www.buxfer.com/tour.php?id=Mobile, Internet site, accessed on Apr. 11, 2008, 1 page.
"Take Buxfer with you on the Internet everywhere!" printed from http://www.buxfer.com/tour.php?id=Gadgets, Internet site, accessed on Apr. 11, 2008, 1 page.
"Amazon Payments Account Management," printed from https://payments.amazon.com/sdui/sdui/paymentabout?about=true, Internet site, accessed on Apr. 11, 2008, 1 page.
"Living with a Roommate in Memphis," memphis apartments tv.com, dated Feb. 15, 2007, printed from http://www.memphisapartmentstv.com/living-with-a-roommate-in-memphis/, Internet site, accessed on Sep. 18, 2007, 2 pages.
"Billshare—a simple app for people who share bills," printed from http://billshare.org/, Internet site, accessed on Sep. 18, 2007, 2 pages.
"Get More from Your PayPal Account," printed from https://www.paypal.com/us/cgi-bin/webscr?cmd=xpt/cps/general/AccountOverview-outside, Internet site, accessed on Sep. 18, 2007, 2 pages.
"How PayPay Works—PayPal," printed from https://www.paypal.com/us/cgi-bin/webscr?cmd=xpt/cps/general/NewConsumerWorks-outside, Internet site, accessed on Sep. 18, 2007, 3 pages.
"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.
"Track Your Online Spending," printed from https://www.paypal.com/us/cgi-bin/webscr?cmd=xpt/cps/general/TrackingMoney-outside, Internet site, accessed on Sep. 18, 2007, 2 pages.
"Enter Details—PayPal," printed from https://www.paypal.com/us/cgi-bin/webscr?cmd=_flow&SESSION=6paX9BKc4FK4EJ8, Internet site, accessed on Sep. 18, 2007, 1 page.
"Review Payment Details—PayPal," printed from https://www.paypal.com/us/cgi-bin/webscr?cmd=_flow&SESSION=RMXX7KRmlnYnF, Internet site, accessed on Sep. 18, 2007, 1 page.
"Savings Plan," printed from http://quicken.intuit.com/images/screenshots/ss_savings_plan_lrg.gif, Internet site, accessed on Mar. 19, 2008, 1 page.
"Quicken Deluxe 2008," printed from http://guicken.intuit.com/personal-finance/deluxe-money-management.jhtml, Internet site, accessed on Mar. 19, 2008, 7 pages.
"SMS Banking," brochure by Acette Technologies FZ LLC, dated 2007, 3 pages.
Tim Ferguson, "Mobile banking rolled out by HSBC," dated Oct. 4, 2006, printed from http://www.silicon.com/financialservices/0,3800010322,39162983,00.htm, Internet site, accessed on Oct. 11, 2007, 2 pages.
Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.
Shelley Elmblad, "Online Banking is Easy on Budgets," dated May 22, 2007, printed from http://building-personal-savings.suite101.com/article.cfm/online_banking_get_the_facts, Internet site, accessed on Oct. 12, 2007, 2 pages.

John R. Quain, "Cellphone Banking Is Coming of Age," dated May 24, 2007, printed from http://www.nytimes.com/2007/05/24/technology/24basics.html?_r=1&oref=slogin, Internet site, accessed on Oct. 12, 2007, 4 pages.

"Ducont—Mobile Payments," printed from http://www.ducont.com/Products/bnf_mdhm.htm, Internet site, accessed on Oct. 11, 2007, 1 page.

"Ducont—Bank.companion," printed from http://www.ducont.com/Products/bnf_bankcomp.htm, Internet site, accessed on Oct. 11, 2007, 1 page.

"MyCheckFree.com," printed from https://mycheckfree.com/br/wps?sp=10001&rg=bfbl, Internet site, accessed on Sep. 14, 2007, 1 page.

"About CheckFree," printed from https://mycheckfree.com/br/wps?rg=login&slpg=Y&file=authentication/login_baseline_about-checkfree&esc=93096239&sp=, Internet site, accessed on Sep. 14, 2007, 1 page.

"MyCheckFree—Frequently Asked Questions," printed from https://mycheckfree.com/br/wps?rg=login&slpg=Y&file=authentication/login_baseline_faq&esc=93096239&sp=10001, Internet site, accessed on Sep. 14, 2007, 5 pages.

"Paytrust : Paying Bills Has Never Been Easier," printed from http://www.paytrust.com/learnmore.shtml, Internet site, accessed on Sep. 14, 2007, 2 pages.

"Why Use Paytrust® Instead of a Traditional Bill-Pay Service?" printed from http://www.paytrust.com/morethanbillpay.shtml, Internet site, accessed on Sep. 14, 2007, 3 pages.

"Paytrust: Frequently Asked Questions," printed from http://www.paytrust.com/commonquestions.shtml, Internet site, accessed on Sep. 14, 2007, 5 pages.

Richard Irons, "What is Envelope Budgeting—Why the Envelope Budgeting System is so Effective?" printed from http://www.mvelopes.com/articles/envelope-budgeting.php, Internet site, 2 pages.

"Pocket Quicken," printed from http://www.landware.com/pocketquicken, Internet site, accessed on Sep. 14, 2007, 2 pages.

"Mobile Quicken™—Stand Alone or Connect with a Click," printed from http://www.landware.com/pocketquicken/moreinfo.html, Internet site, accessed on Sep. 14, 2007, 4 pages.

"UnitedOne Credit Union," printed from http://www.unitedone.org/ASP/home.asp, Internet site, accessed on Sep. 14, 2007, 3 pages.

"UnitedOne Credit Union—Calendar Help," printed from https://s146.lanxtra.com/servlet/EchoTemplateServlet?template=/2/en/IBHelp.vm&help=10901, Internet site, accessed on Sep. 14, 2007, 5 pages.

"Quicken Starter Edition 2008," printed from http://quicken.intuit.com/personal-finance/starter-edition-personal-budget.jhtml, Internite site, accessed on Sep. 14, 2007, 5 pages.

"Jul. 2007 calendar," printed from http://quicken.intuit.com/images/screenshots/ss_calendar lrg.gif, Internet site, accessed on Sep. 14, 2007, 1 page.

"Navigator," dated Jul. 2006, printed from www.pscu.org, Internet site accessed on Oct. 17, 2007, 2 pages.

"Bank of America Privacy Assist Premier™—Protect your credit and identity," printed from http://www.bankofamerica.com/pap/index.cfm?template=pap assist premier, Internet site, accessed on Oct. 17, 2007, 2 pages.

"Identity Theft Protection—Bank of America Privacy Assist Premier™," printed from http://www.bankofamerica.com/pap/index.cfm?template=pap assist premier, Internet site, accessed on Oct. 17, 2007, 2 pages.

"Bank of America—Online Bill Pay and e-Bills Frequently Asked Questions," printed from http://www.bankofamerica.com/onlinebanking/index.cfm?template=faq billpay, Internet site, accessed on Oct. 17, 2007, 2 pages.

"Technology Credit Union," printed from http://www.techcu.com/resources/about_tech_cu/privacy/online.htm, Internet site, accessed on Oct. 17, 2007, 1 page.

"Billshare.org—Make Bill Paying with Roomies Easy—KillerStartups.com," printed from http://www.killerstartups.com/Web20/billshare—Make-Bill-Paying-with-Roomies-Easy/, Internet site, accessed on Sep. 18, 2007, 4 pages.

Every Penny Counts, Inc., Patent Property Due Diligence Chart, prepared Aug. 30, 2007, 8 pages.

Office Action dated Apr. 2, 2009 for U.S. Appl. No. 12/152,028, filed May 12, 2008.

Office Action dated Sep. 16, 2009 for U.S. Appl. No. 12/152,028, filed May 12, 2008.

* cited by examiner

FAMILY PURCHASE CARD FOR DEVELOPING FINANCIAL MANAGEMENT SKILLS

FIELD OF THE INVENTION

The invention generally relates to systems, processes, tools, techniques and strategies for managing financial resources. In various embodiments, the invention more particularly relates to purchase cards for performing financial transactions, such as the purchase of goods or services.

BACKGROUND

Consumer spending is an important component of modern worldwide economies. Consumers have significant assets and financial resources at their disposal that can be used to purchase a variety of goods and services.

The financial resources of consumers are often maintained and made available for use through checking accounts, savings accounts and other accounts held at different types of financial entities such as banking institutions. Effectively and efficiently managing financial resources can be challenging, however, and many consumers accordingly rely on their banking institutions to provide tools that can help them manage their finances. Such tools need to be nimble and intelligent in their ability to provide ready access to consumer financial information. Also, the tools need to mesh well with the lifestyles of the consumers, especially in the context of applying consumer financial resources to purchase transactions. In particular, there are insufficient financial tools available for educating younger or less mature consumers on credit and wealth management, for assisting more mature cardholders with day-to-day expenses, and for supporting families with credit education and financial organization.

It is not unusual for younger, less mature consumers to be bombarded with numerous offers for credit cards and other types of purchase cards; however, such consumers often have little or no prior experience with using credit cards and managing money and expenses. Older, less mature consumers may also be faced with credit and expense management issues, and due to a lack of experience with credit cards such consumers may become easy prey for unscrupulous businesses seeking to exploit uneducated and trusting consumers. Despite the disadvantages of possessing credit cards without the proper knowledge and experience to use them, there are nonetheless many good reasons for less mature consumers to have access to credit cards. When used properly, credit cards can provide substantial benefits to a variety of less mature cardholders. For example, credit cards can provide purchase protection, build credit for future purchases, provide a cushion in case of emergencies, and reduce the need to carry cash.

In view of the issues described above, enhanced systems, processes, tools, techniques and strategies are needed for managing financial resources, including the resources and assets of consumers who employ purchase cards for purchase transactions.

BRIEF DESCRIPTION OF THE FIGURES

The utility of the embodiments of the invention will be readily appreciated and understood from consideration of the following description of the embodiments of the invention when viewed in connection with the accompanying drawings, wherein.

DESCRIPTION

Embodiments of the invention provide enhanced processes, methods, tools, strategies, techniques for more effectively and efficiently managing financial resources, including financial transactions involving purchase cards for purchasing goods or services. In various embodiments, the invention provides a family purchase card as a flexible financial management vehicle that can satisfy financial needs and establish sound credit practices for families, while reducing asset management risks and losses and building product loyalty benefits for financial institutions. The invention may also provide benefits as a teaching tool by offering credit flexibility within the family structure. Embodiments of the invention provide a purchase card with the ability to allocate credit lines, monitor usage, establish creditworthiness, and reduce risk in a user friendly environment.

As applied herein, the term "purchase card" is intended to broadly encompass, for example and without limitation, credit cards, debit cards, discount cards, membership cards, and other like instruments. In various embodiments of the invention, a purchase card may be any instrument or device that can be configured for use in association with purchasing goods or services by drawing or applying funds or credit from an account (e.g., a credit account of a credit card company, or a checking account of a banking institution). For example, while many embodiments of the invention are described herein with respect to credit purchase transactions (credit cards, credit lines, etc.), it can be appreciated that such embodiments can be analogously applied to debit purchase transactions (e.g., debit cards, account balances, etc.) and suitably applied to other types of transactions.

For convenience of disclosure, the term "purchase limit" may be employed herein with respect to use of purchase cards for purchase transactions. Depending on the appropriate context, a "purchase limit" for a purchase card may be a credit limit for a credit card type of purchase card, for example, or may be an amount available for a debit card type of purchase card.

The meaning of the term "family" as applied herein broadly encompasses the ordinarily understood meaning of "family" as well as other types of groups of individuals (e.g., employees, students, patients, etc.) who can make beneficial use of certain embodiments of the invention. In various embodiments, a family may also encompass any agents, employees, consultants, contractors, service providers, or other entities that interact with or assist the family (e.g., a childcare provider such as a nanny, a landscaper, a housekeeper, etc.).

In certain embodiments of the invention, use of the term "direct family" means that a familial relationship exists between the members of the direct family who are related as, for example, father, mother, son, daughter, brother, sister, grandfather, grandmother, aunt, uncle, cousin, and other like direct family relationships.

Figure 1:
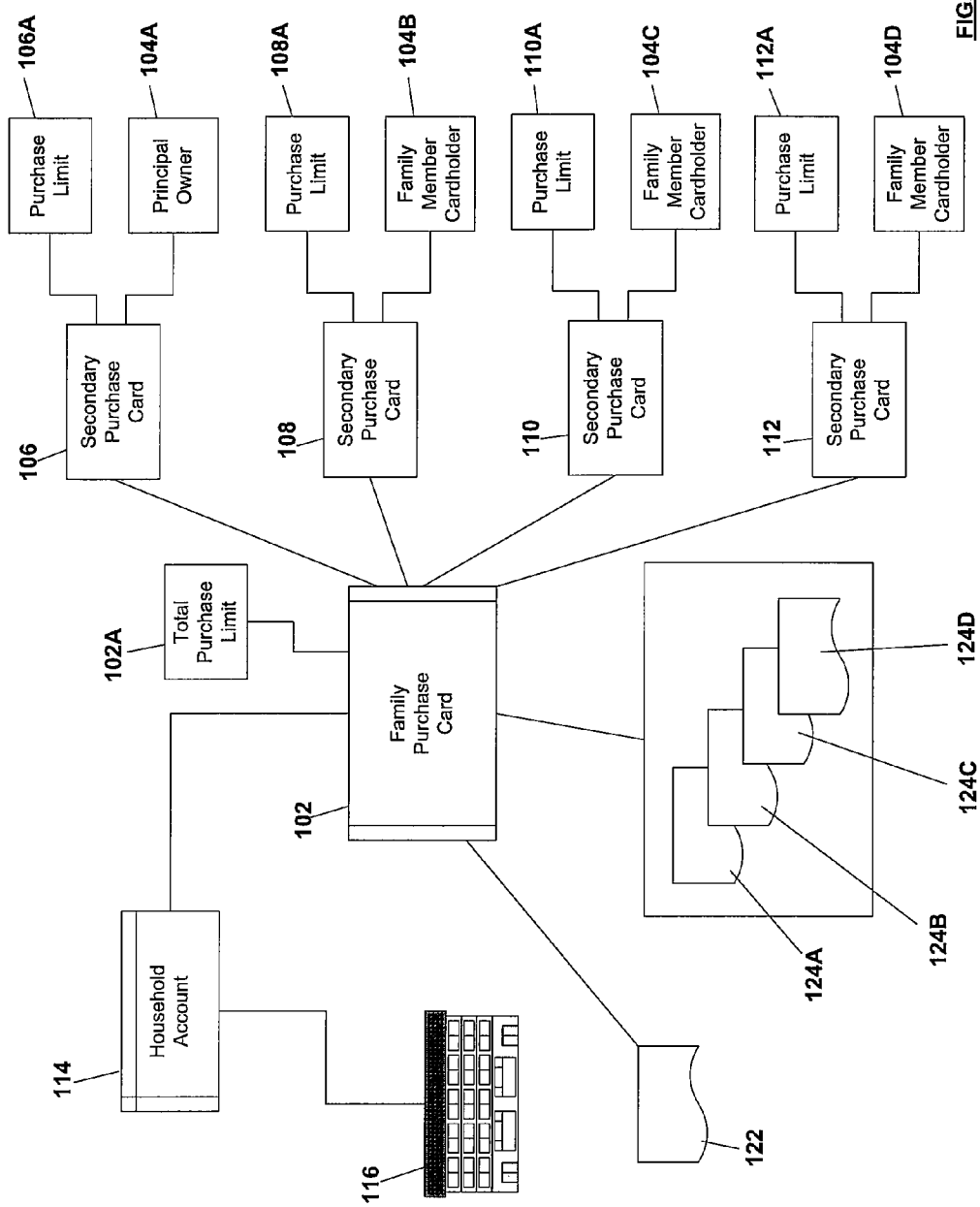
FIG. 1 schematically illustrates examples of structuring various aspects of family purchase cards in accordance with certain embodiments of the invention.

With reference to the example of FIG. 1, various embodiments of the invention provide a family purchase card 102. The family purchase card 102 offers a platform for a family 104 (shown as family members 104A-104D) to associate one or more distinct secondary purchase cards 106, 108, 110, 112 with a household account 114 held at a financial institution 116 (e.g., a banking institution) and to allocate purchase limits 106A, 108A, 110A, 112A among the family 104 as needed or desired. Within the family 104, a principal owner 104A can be designated for the household account 114 to manage the total credit line, total account balance or other total purchase limit 102A associated with the family purchase card 102. Each individual cardholder 104A-104D within the family 104 may be provided with a unique purchase card number and with a purchase limit 106A, 108A, 110A, 112A tailored to the family member 104A-104D by the principal owner 104A. For example, the individual family members 104A-104D may be children, spouses, elderly parents, nannies, housekeepers, or any other party that interacts with or assists the family 104. As the needs of each family member 104A-104D change, the purchase limits 106A, 108A, 110A, 112A associated with the secondary purchase cards 106, 108, 110, 112 can be readily adjusted to accommodate a current situation or circumstances.

The principal owner 104A may be responsible for managing the total purchase limit 102A (e.g., total credit, total debit amount available, etc.) on the household account 114 and for allocating purchase limits 106A, 108A, 110A, 112A to the individual family members 104A-104D. The principal owner 104A may also be responsible for making or guaranteeing payment for purchase transactions made in connection with the secondary purchase cards 106, 108, 110, 112. In various embodiments, the household account 114 can be structured for either a centralized billing and payment arrangement or an individualized billing and payment arrangement. For example, a centralized billing arrangement for the household account 114 provides for one central billing statement 122 sent to the principal owner 104A with a list of all aggregate monthly charges or credits for all family cardholders 104A-104D and which may reflect one total amount due for payment. Under the centralized billing arrangement, individual family members 104A-104D may also receive memorandum statements outlining monthly activity for their respective secondary purchase cards 106, 108, 110, 112, but with no remittance or payment required. The centralized billing statement 122 may be configured to identify all cardholders 104A-104D on the household account 114 and the corresponding charges for each cardholder 104A-104D. Under an individualized billing arrangement, an individual bill 124A-124D can be sent with an individual statement to each cardholder 104A-104D in the family 104 outlining the periodic (e.g., monthly) activity specific to each secondary purchase card 106, 108, 110, 112 and an amount due on a card-by-card basis. In certain embodiments, each individual cardholder 104A-104D can be made primarily responsible for payment on the secondary purchase card 106, 108, 110, 112; however, the principal owner 104A may be made ultimately responsible for any delinquency or other failure to make payment on the individual bills 124A-124D.

In certain embodiments, a predetermined comparatively less financially mature portion of the family 104 may be managed under a centralized billing arrangement (e.g., members of the family 104 still developing adequate money and credit management skills); and a predetermined comparatively more financially mature portion of the family 104 may be managed under an individualized billing arrangement (e.g., members of the family 104 who have adequate credit management skills). Also, the principal owner 104A may want to receive bills for purchases by a nanny or other service provider, for example, but may not need to see bills for a college-age son.

In various embodiments, the principal owner 104A may be permitted to monitor what each family member 104A-104D is purchasing with their respective secondary purchase cards 106, 108, 110, 112, with or without the ability to activate or deactivate the purchase cards 106, 108, 110, 112. For example, the principal owner 104 may be authorized to configure a deactivation rule which deactivates a credit card line or purchase limit 106A, 108A, 110A, 112A based on monitored purchase history or payment history. In certain embodiments, activation or deactivation rules may be applied which restrict the ability to use one or more of the purchase cards 106, 108, 110, 112 for purchase transactions involving a certain type of merchant, a specific merchant or merchants, and/or a certain type of goods or services. For example, a rule may be applied which limits the secondary purchase card 106, 108, 110, 112 for use only at a gas station, only at a grocery store, or only a clothing store. Also, use of the purchase cards 106, 108, 110, 112 may be restricted for specific brand name merchants (e.g., no purchases can be made at "ABC Fast Food Restaurant"). In addition, use of the purchase cards 106, 108, 110, 112 may be restricted for a certain type or classification of good or service. Such classification of types of goods and services may be accomplished through use of a Universal Product Code (UPC), for example, or another suitable classification system. For example, the purchase card 106, 108, 110, 112 may be configured for use only with purchase transactions involving some combination of fuel, food, or clothing.

In addition, the principal owner 104A may be permitted to maintain or remove his responsibility for one or more bills under different billing arrangements. In certain embodiments, the family purchase card 102 may be structured so that delinquent payments or defaults only affect the credit score of the family member 104A-104D associated with the secondary purchase card 106, 108, 110, 112 which is delinquent or in default. Also, the principal owner 104A may be only secondarily or partially responsible for the actions of the primary defaulting or delinquent party (e.g., the dad only pays if the son cannot pay), and/or the principal owner 104A may be notified and given the opportunity to pay a delinquent bill for the secondary purchase card 106, 108, 110, 112 to avoid a negative credit score impact for the principal owner 104A and/or the family member 104A-104D associated with the delinquent bill.

In various embodiments, parameters or terms of the family purchase card 102 may be altered as a family member 104A-104D achieves a predetermined chronological age, establishes an employment history, achieves a certain grade level or degree in school, and/or achieves other financial development milestones which may be an indication of improved financial skills. Non-limiting examples of parameter alterations or adjustments include increasing the purchase limits 106A, 108A, 110A, 112A; moving a family member 104A-104D from a centralized billing arrangement to an individualized billing arrangement; or other adjustments that acknowledge maturity or enhancement of financial management skills by the family member 104A-104D. For example, a purchase limit 110A for a daughter 104C in the family 104 might be initially set at $500 with the option to increase to $1000 once the daughter 104C has worked at a job or established an employment history for a period of six months or more.

In practicing embodiments of the invention, it can be seen that the principal owner 104A may choose a comparatively smaller purchase limit for a young adult in the family 104, for example, while choosing a comparatively larger purchase limit for a more mature or experienced user. Providing credit card access, for example, to an inexperienced consumer in a controlled environment enables the family 104 and the cardholder to experience credit card usage and obtain financial management experience with reduced risk. Thus, the family credit card 102 platform of the invention serves as an educational tool to encourage graduated credit exposure while mitigating risk. As less mature members of the family 104 establish sensible money management practices, those members will likely become more confident about moving into other types of credit card or purchase card products.

Figure 2:
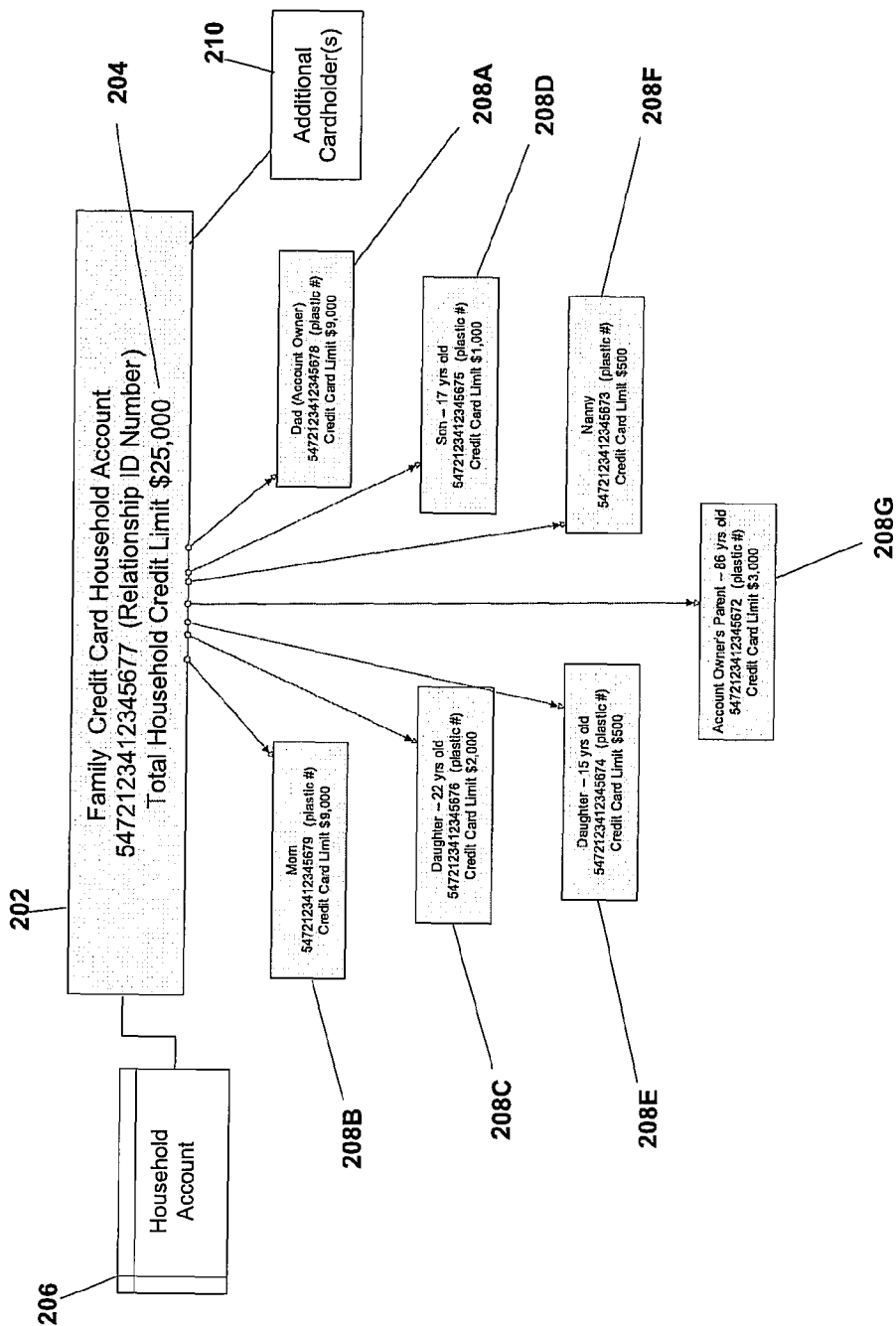
FIG. 2 schematically illustrates an example of a family credit card configured in accordance with certain embodiments of the invention.

FIG. 2 illustrates an example of a credit card type of family purchase card 202 structured in accordance with certain embodiments of the invention. As shown, the total purchase limit 204 for the family credit card 202 is $25,000 in association with a household account 206. In this example, seven cardholders 208A-208G with separate cards having unique numbers share the $25,000 credit line. As described above, the individual credit lines for each card can vary as a function of individual needs, risk, and/or credit experience, and individual credit lines can be adjusted as the needs of the family 208 change. Additional cardholders 210 can be added or existing cardholders can be removed from the cardholder relationship with the family credit card 202. The account owner 208A (e.g., the applicant responsible for the account) can establish the household account 206 credit line, allocate individual credit lines, and perform any general management or maintenance for the household account 206. For example, the account owner 208A may be authorized to determine if the household account 206 and the family credit card 202 will be centrally billed or individually billed (as described above).

It can be seen that the flexibility of the family credit card 202 enables the account owner 208A to monitor family expenses and to adjust credit lines in a safe and controlled environment. There may be no specific number of cardholders required to establish the family credit card 202 with the household account 206; or there may be a minimum or maximum number of cardholders specified. The account owner 208A may be authorized to specify the number of cardholders in the relationship and determine credit allocation for the family 208 accordingly. In addition, the account owner 208A may be permitted to start with centralized billing, for example, to monitor expense activity and then subsequently switch to individualized billing as the family 208 credit experience matures, thereby continuing the graduation effort from a family credit card 202 product to other more individualized types of credit card products. Demonstrating individual credit responsibility within the family credit card 202 framework may serve as a prerequisite for cardholders within the family 208 to secure credit on their own with a standard credit card product. Demonstration of such responsibility and development of money management skills can be accomplished within the controlled environment provided by the family credit card 202 framework.

Figure 3:
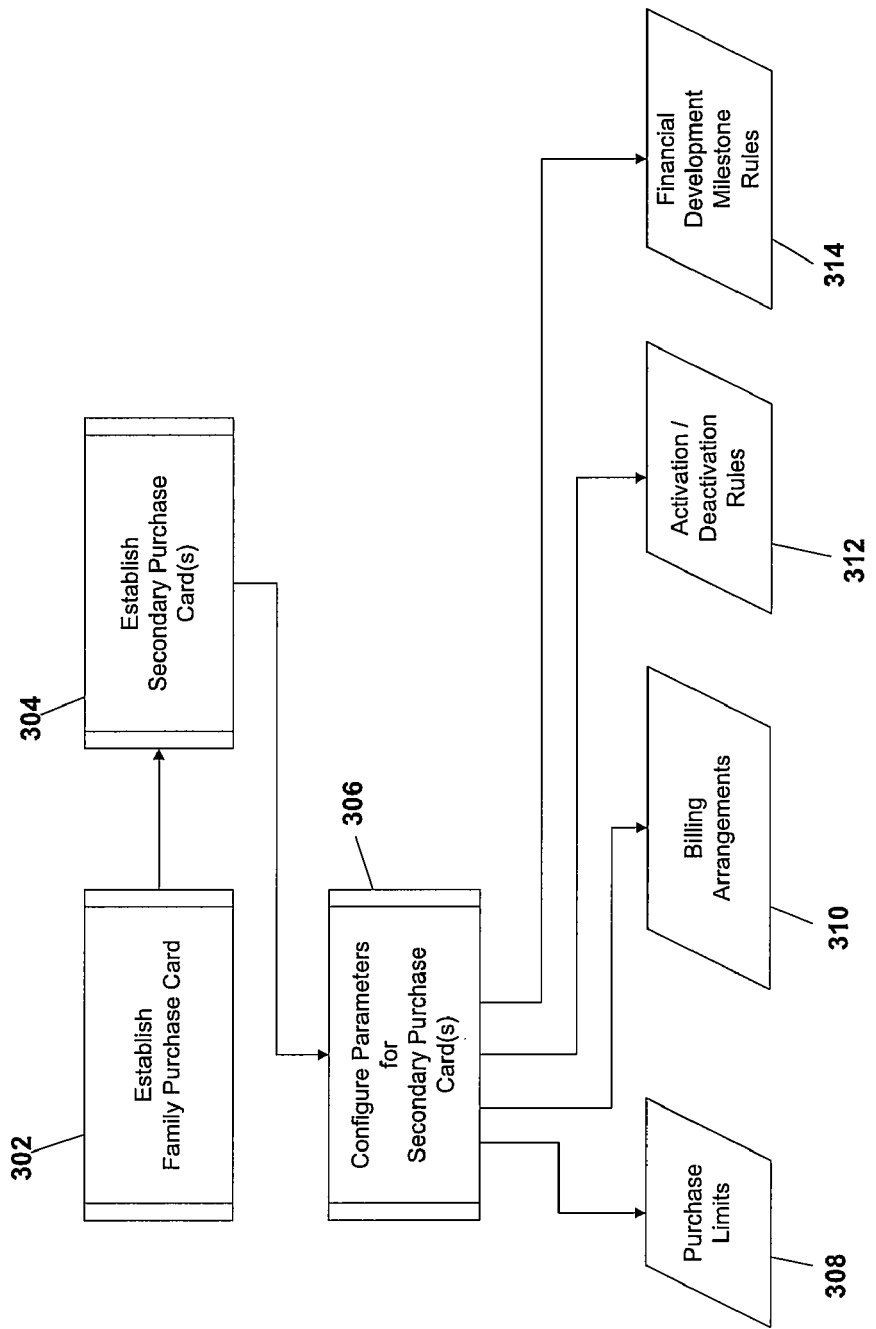
FIG. 3 includes a process flow diagram illustrating examples of establishing and configuring parameters for a family purchase card in accordance with certain embodiments of the invention.
Figure 4:
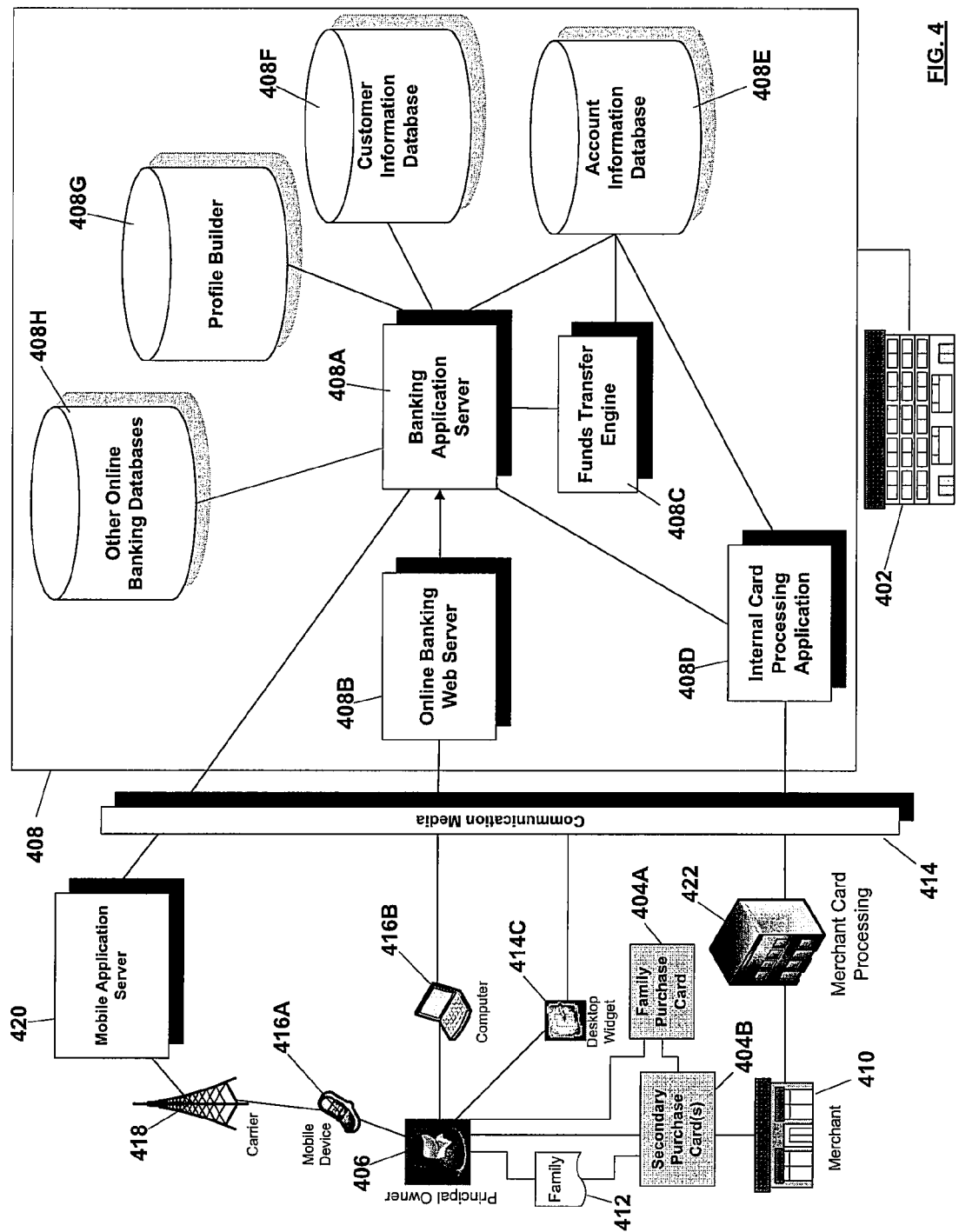
FIG. 4 includes a system diagram illustrating an example of a data communication and data processing architecture structured in accordance with certain embodiments of the invention.

With reference to FIGS. 3 and 4, at step 302 a financial institution 402 can establish a family purchase card 404A for a principal owner 406 through a purchase card transaction system 408 of the financial institution 402. The financial institution 402 may be a banking institution, a commercial bank, or a consumer banking entity, for example. The family purchase card 404 may be configured to allow the principal owner 406 to conduct transactions involving the purchase of goods or services from a variety of different merchants 410, and to extend one or more secondary purchase cards 404B to a family 412 associated with the principal owner 406 at step 304. For example, the family purchase card 404A may be embodied as a credit card that permits the principal owner 406 and designated members of the family 412 to apply credit transactions against a household account which the principal owner 406 establishes and maintains through the financial institution 402. In certain embodiments, such household accounts may be credit card accounts, checking accounts, savings accounts, investment accounts, a combination of the foregoing accounts, or another account of the financial institution 402.

At step 306, various parameters for the secondary purchase cards 404B may be configured or adjusted by the principal owner 406 through the purchase card transaction system 408. Such parameters may include purchase limits (at step 308); billing arrangements (at step 310); activation or deactivation rules (at step 312); financial development milestone rules (at step 314); and/or other parameters. In addition, functions such as displaying an available balance for the secondary purchase cards 404B may be performed through the transaction system 408. As shown, the transaction system 408 may include a banking application server 408A configured to perform various functions and tasks within the system 408. For example, the banking application server 408A may be operatively associated with an online banking web server 408B which may be configured to send and receive communications through various communication media 414. Examples of communication media 414 may include, for example and without limitation, a wireless data network, a wireline network, and/or a networked medium or media, such as an Internet or intranet connection. In certain embodiments, the communication media 414 may be implemented using the Internet, although it will be understood that any public or private communication network suitable for enabling the electronic exchange of information between the transaction system 408 and the principal owner 406 (or other users) using wireline and/or wireless communication channels may be used. The communication media 414 may be protected with one or more firewalls, for example, or other measures for promoting secure and/or authenticated communications. The transaction system 408 may be implemented by the bank or other financial institution 402 and configured to provide network-based product and service features to the customers 406.

The customers 406 may interact with the transaction system 408 through the communication media 414 by using one or more different types of access devices 416, such as a mobile device 416A (e.g., mobile phone, smart phone, cell phone, personal data assistant (PDA), etc.), a computer system 416B (e.g., laptop, desktop, notebook, etc.), and/or a desktop widget 416C. The access devices 416 may include a suitable browser software application (e.g., Internet Explorer) for enabling the access devices 416 to display and interact with information exchanged through the communication media 414. The principal owner 406 may thus access and navigate static and/or dynamic HTML documents on one or more different user interfaces generated by the purchase card transaction system 408 for display on the access device 416. For example, the balance available for the secondary purchase card 404B may be displayed on the access device 416 through use of a mobile buffer short message service (SMS). As shown in the example of FIG. 4, the mobile device 416A may be configured to send or receive data through a mobile carrier 418. The mobile carrier 418 may be operatively associated with a mobile application server 420, which can be configured to exchange data between the purchase card transaction system 408 and the mobile carrier 418 and to facilitate communications sent to or received by the mobile device 416A.

In various embodiments, the purchase card transaction system 408 may be based on a tiered-network architecture and may include the banking application server 408A, the online banking web server 408B, a funds transfer engine 408C, an internal card processing application 408D, and one or more data storage media 408E-408H, as shown in the system architecture example of FIG. 4.

The online banking web server 408B may correspond to a first tier of the purchase card transaction system 408 and may be configured to communicate with the communication media 414 and the banking application server 408A. The web server 408B may be configured to accept information requests (e.g., HTTP requests) from one or more of the access devices 416 via the communication network 414 and provide suitable responses thereto. The responses may include, for example, HTTP responses including static and/or dynamic HTML documents for providing an Internet banking user interface to the principal owner 406 (or other users) through the access devices 416. The web server 408B may further be configured to authenticate credentials for the principal owner 406 before allowing access to user interfaces and other resources associated with the transaction system 408. Authentication may be performed, for example, using a user name and a password.

The banking application server 408A may correspond to another tier of the purchase card transaction system 408 and may be configured to communicate with the web server 408B and the databases 408E-408H. The application server 408A may host one or more applications executing logic to provide banking product and service features to the principal owner 406 through the access devices 416. The application server 408A may receive and process user-entered information communicated through the web server 408B from the user interface displayed on each access device 416. Such communicated information may include, for example, requests to configure parameters for the secondary purchase card 404B, requests to display account information and balances, a user name and password associated with the user 406, and/or requests to access other banking features and functions. Based on this and other information received from users 406, applications hosted and executed by the application server 408A may perform financial transactions (e.g., transfer funds between accounts, retrieve account balances, generate billing statements, etc.) and generate corresponding informational content (e.g., transfer confirmations, account balance information, billing information, etc.). Information regarding such transactions may be communicated to the web server 408B and subsequently presented to the principal owner 406 using a dynamic web page interface, for example. In various embodiments, the funds transfer engine 408C may be embodied as a computer system that executes fund transfers within the transaction system 408 and/or updates account information (e.g., balance transfers) in the account information database 408E.

The databases 408E-408H may correspond to another tier of the purchase card transaction system 408, and the databases 408E-408H may be configured to communicate with the banking application server 408A to retrieve, store, or process data to support one or more applications hosted by the application server 408A or elsewhere in the system 408. The customer information database 408F may include data and other information related to names, addresses, and other demographic data associated with the principal owner 406. The profile builder database 408G may include data and other information related to customer preferences and account settings. In certain embodiments, one or more other databases 408H may also be provided within the transaction system 408, such as a database for storing rules configured in association with use and operation of the secondary purchase cards 404B. Database 408E-408H information requested by a particular application or program of the application server 408A may be retrieved from the databases 408E-408H, communicated to the requesting application, and the databases 408E-408H may be subsequently updated by the application server 408A once processing of a task or function is completed.

In various embodiments, the internal card processing application 408D can be configured to receive purchase transaction data communicated from merchants 410 through a merchant card processing function 422. The internal card processing application 408D may receive requests for payment from the merchants 410 for purchase transactions, advise the banking application server 408A that purchase transactions have been initiated or consummated, and/or update the account information database 408E when purchase transactions occur.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that various embodiments described herein, or components or parts thereof, may be implemented in many different embodiments of software, firmware, and/or hardware, applications, or modules thereof. The software code or specialized control hardware used to implement some of the present embodiments is not limiting of the present invention. It can also be appreciated that certain process aspects described herein may be performed using instructions stored on a computer-readable memory medium or media that direct a computer system to perform process steps. For example, the embodiments described hereinabove may be implemented in computer software using any suitable computer software language type such as, for example, C, C#, .NET, SQL, MySQL, HTML, or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site).

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "propagation medium" may include one or more data signals transmitted on one or more carrier waves. Such a medium may include any of the forms listed above with respect to storage devices and may further include, for example, a carrier wave modulated, or otherwise manipulated, to convey instructions that may be read, demodulated/decoded and executed by a computer.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-implemented method for establishing a family purchase card, the method comprising:
   establishing a family purchase card in association with a principal owner of a family with a purchase card transaction system including an electronic processor and at least one computer-readable memory device, wherein the family purchase card is associated with a household account held at a financial institution and wherein the family purchase card includes a total purchase limit;
   establishing at least one secondary purchase card associated with the family purchase card with the transaction system for at least one cardholder within the family; and
   configuring at least one parameter for at least one of the secondary purchase cards with the transaction system, wherein the parameter is selected from the group consisting of:
   (i) purchase limit,
   (ii) billing arrangement,
   (iii) activation or deactivation rule, and
   (iv) financial development milestone rule;
   adjusting a centralized billing arrangement associated with at least one secondary purchase card to an individualized billing arrangement in response to achieving a financial development milestone;
   wherein if payment on the secondary purchase card is delinquent or in default, negatively impacting only the credit score of the cardholder associated with the secondary purchase card which is delinquent or in default.

2. The method of claim 1, wherein the principal owner is responsible for managing the total purchase limit and for allocating purchase limits for each secondary purchase card among individual members of the family.

3. The method of claim 1, wherein the principal owner is solely responsible for making payment for purchase transactions made in connection with the secondary purchase cards.

4. The method of claim 1, wherein each cardholder of the family is primarily responsible for payment on the secondary purchase card and the principal owner is ultimately responsible for failure to make payment on the secondary purchase card.

5. The method of claim 1, further comprising managing a predetermined comparatively less financially mature portion of the family under a centralized billing arrangement and managing a predetermined comparatively more financially mature portion of the family under an individualized billing arrangement.

6. The method of claim 1, further comprising permitting the principal owner to monitor the purchase history of each secondary purchase card and providing the principal owner with the ability to activate or deactivate the secondary purchase card.

7. The method of claim 1, further comprising permitting the principal owner to monitor the payment history of each secondary purchase card and providing the principal owner with the ability to activate or deactivate the secondary purchase card.

8. The method of claim 1, further comprising providing the principal owner with an opportunity to pay a delinquent bill for a secondary purchase card to avoid a negative credit score impact for the principal owner and another cardholder.

9. The method of claim 1, wherein the financial development milestone includes achieving a predetermined chronological age.

10. The method of claim 1, wherein the financial development milestone includes establishing an employment history for a period of six months or more.

11. The method of claim 1, wherein the financial development milestone includes achieving a predetermined grade level or educational degree.

12. The method of claim 1, further comprising adjusting a purchase limit for the secondary purchase card in response to achieving the financial development milestone.

13. The method of claim 1, wherein the family purchase card is a family credit card.

14. The method of claim 1, wherein the family purchase card is a family debit card.

15. The method of claim 1, wherein the family comprises a direct family.

16. The method of claim 1, further comprising adjusting the activation or deactivation rule for the secondary purchase card in response to a predetermined comparatively less financially mature family member achieving the financial development milestone.

17. A system for establishing a family purchase card, the system comprising:
　　a purchase card transaction system including an electronic processor and at least one computer-readable memory device, the system programmed for:
　　　　establishing a family purchase card in association with a principal owner of a family, wherein the family purchase card is associated with a household account held at a financial institution and wherein the family purchase card includes a total purchase limit; and
　　　　(ii) establishing at least one secondary purchase card associated with the family purchase card for at least one cardholder within the family;
　　　　wherein if payment on the secondary purchase card is delinquent or in default, negatively impacting only the credit score of the cardholder associated with the secondary purchase card which is delinquent or in default; and
　　an electronic banking application server operatively associated with the transaction system, the application server programmed for facilitating configuring at least one parameter for at least one secondary purchase card, wherein the parameter is selected from the group consisting of:
　　　　(i) purchase limit,
　　　　(ii) billing arrangement,
　　　　(iii) activation or deactivation rule, and
　　　　(iv) financial development milestone rule;
　　adjusting a centralized billing arrangement associated with at least one secondary purchase card to an individualized billing arrangement in response to achieving a financial development milestone.

18. A computer-implemented method for establishing a family purchase card, the method comprising:
　　establishing a family purchase card in association with a principal owner of a family with a purchase card transaction system including an electronic processor and at least one computer-readable memory device, wherein the family purchase card is associated with a household account held at a financial institution and wherein the family purchase card includes a total purchase limit;
　　establishing with the transaction system at least one secondary purchase card associated with the family purchase card for at least one cardholder within the family;
　　permitting the principal owner to monitor the purchase history and payment history of each secondary purchase card; and
　　configuring at least one parameter for at least one of the secondary purchase cards with the transaction system, wherein the parameter is selected from the group consisting of:
　　(i) purchase limit,
　　(ii) billing arrangement,
　　(iii) activation or deactivation rule, and
　　(iv) financial development milestone rule;
　　sending a centralized billing statement to the principal owner and sending a memorandum statement with no payment required to the at least one cardholder associated with the secondary purchase card;
　　adjusting a centralized billing arrangement associated with at least one secondary purchase card to an individualized billing arrangement in response to achieving a financial development milestone; and
　　wherein if payment on the secondary purchase card is delinquent or in default, negatively impacting only the credit score of the cardholder associated with the secondary purchase card which is delinquent or in default.

19. The method of claim 16, wherein the deactivation rule includes restricting the ability to use the secondary purchase card for purchase transactions involving a type of merchant.

20. The method of claim 16, wherein the deactivation rule includes restricting the ability to use the secondary purchase card for purchase transactions involving a specific merchant.

21. The method of claim 16, wherein the deactivation rule includes restricting the ability to use the secondary purchase card for purchase transactions involving a type of goods or services.

22. The method of claim 16, wherein the activation rule includes allowing the ability to use the secondary purchase card for purchase transactions involving a type of merchant.

23. The method of claim 16, wherein the activation rule includes allowing the ability to use the secondary purchase card for purchase transactions involving a specific merchant.

24. The method of claim 16, wherein the activation rule includes allowing the ability to use the secondary purchase card for purchase transactions involving a type of goods or services.

\* \* \* \* \*